(12) United States Patent
Pi et al.

(10) Patent No.: US 8,611,259 B2
(45) Date of Patent: Dec. 17, 2013

(54) METHOD AND SYSTEM FOR PROVIDING CHANNEL STATE INFORMATION FEEDBACK IN A WIRELESS COMMUNICATION SYSTEM

(75) Inventors: Zhouyue Pi, Richardson, TX (US); Eddy Kwon, Gyeonggi-do (KR); Jin-Kyu Han, Seoul (KR); Donghee Kim, Gyeonggi-do (KR); Daegyun Kim, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1120 days.

(21) Appl. No.: 11/809,798

(22) Filed: Jun. 1, 2007

(65) Prior Publication Data
US 2008/0062920 A1    Mar. 13, 2008

Related U.S. Application Data

(60) Provisional application No. 60/843,189, filed on Sep. 8, 2006.

(51) Int. Cl.
*H04L 12/26* (2006.01)
*H04B 7/005* (2006.01)
*H04B 17/00* (2006.01)
*H04B 7/00* (2006.01)

(52) U.S. Cl.
USPC .......... 370/278; 370/252; 455/67.13; 455/69; 455/522

(58) Field of Classification Search
USPC ............ 370/252, 278, 328; 455/67.11, 67.13, 455/68–69, 522
See application file for complete search history.

(56) References Cited

U.S. PATENT DOCUMENTS

| | | | |
|---|---|---|---|
| 7,116,944 B2* | 10/2006 | Das et al. | 455/69 |
| 2005/0170782 A1* | 8/2005 | Rong et al. | 455/67.11 |
| 2005/0232156 A1 | 10/2005 | Kim et al. | |
| 2005/0265436 A1 | 12/2005 | Suh et al. | |
| 2006/0014542 A1* | 1/2006 | Khandekar et al. | 455/447 |
| 2006/0146920 A1 | 7/2006 | Suh et al. | |
| 2006/0233131 A1* | 10/2006 | Gore et al. | 370/328 |
| 2007/0218950 A1* | 9/2007 | Codreanu et al. | 455/562.1 |
| 2007/0242770 A1* | 10/2007 | Kim et al. | 375/267 |
| 2007/0253508 A1* | 11/2007 | Zhou et al. | 375/267 |

FOREIGN PATENT DOCUMENTS

WO    WO 2006/028204 A1    3/2006

OTHER PUBLICATIONS

International Search Report issued on Dec. 17, 2007 in International Application No. PCT/KR2007/004339.

* cited by examiner

*Primary Examiner* — Redentor Pasia (57) ABSTRACT

A method of providing channel state information feedback in a wireless communication system is provided. The method includes measuring original channel state information for each of a plurality of channels. An offset vector is applied to the original channel state information to generate modified channel state information. A subset of the channels is identified based on the modified channel state information. The original channel state information or the modified channel state information is reported.

20 Claims, 4 Drawing Sheets

METHOD AND SYSTEM FOR PROVIDING CHANNEL STATE INFORMATION FEEDBACK IN A WIRELESS COMMUNICATION SYSTEM

CROSS-REFERENCE TO RELATED APPLICATION AND CLAIM OF PRIORITY

The present invention is related to the invention disclosed in U.S. Patent Application Ser. No. 60/843,189, titled "Methods and Apparatus to Feedback Channel State Information in OFDMA Systems," filed on Sep. 8, 2006. Patent Application Ser. No. 60/843,189 is assigned to the assignee of the present application. The subject matter disclosed in Patent Application Ser. No. 60/843,189 is hereby incorporated by reference into the present disclosure as if fully set forth herein. The present application hereby claims priority under 35 U.S.C. §119(e) to Patent Application Ser. No. 60/843,189.

TECHNICAL FIELD OF THE INVENTION

The present disclosure relates generally to wireless communications and, more specifically, to a method and system for providing channel state information feedback in a wireless communication system.

BACKGROUND OF THE INVENTION

Currently-implemented wireless communication networks, such as orthogonal frequency division multiplexing (OFDM) networks and the like, often use channel state information feedback from subscriber stations to enable advanced performance enhancement technologies. For example, channel state information may be used for frequency-domain and time-domain channel-sensitive scheduling, as well as for the application of closed-loop multi-antenna technologies. One common representation of channel state information is a Channel Quality Indicator (CQI), which is a measure of channel quality often obtained by normalizing the effective channel gain by interference power. To derive equivalent CQI information, further processing of channel state information may be performed. For example, a capacity formula or a constrained capacity formula, given the input of channel and interference information, may be applied to derive the equivalent CQI information. CQI fluctuates with channel and interference variation. In certain scenarios, feedback of CQI for multiple channels may be desired, such as situations in which multiple logical or physical channels are used or in which multiple streams in a MIMO channel are used.

To reduce the amount of feedback overhead, often only a few of the best CQIs are selected for feedback. The system may then attempt to improve performance by selectively transmitting to users on channels with favorable channel conditions. However, this becomes problematic when the CQIs in multiple channels are very different. In this case, although the CQIs fluctuate, the user may always choose to report CQI for one particular channel because that particular channel is always favorable to him regardless of the channel fluctuation. For example, when frequency reuse schemes are applied and a certain frequency is in frequency reuse, the channel condition in that frequency is likely to be more favorable for certain users in certain sectors. These users may always request to be served on the frequency that is in frequency reuse. In this case, that particular frequency may become heavily loaded while other frequencies are not efficiently utilized. Therefore, there is a need in the art for an improved method for providing channel state information feedback in a wireless communication system.

SUMMARY OF THE INVENTION

A method for providing channel state information feedback in a wireless communication system is provided. According to an advantageous embodiment of the present disclosure, the method includes measuring original channel state information for each of a plurality of channels. An offset vector is applied to the original channel state information to generate modified channel state information. A subset of the channels is identified based on the modified channel state information. The original channel state information or the modified channel state information is reported for the identified subset of the channels.

According to another embodiment of the present disclosure, a method of providing channel state information feedback in a wireless communication system in which a plurality of channels are available for communication is provided. The method includes receiving reported channel state information for each of a subset of channels from a subscriber station. The subset of channels is identified by the subscriber station based on modified channel state information that is generated based on original channel state information. Scheduling and resource allocation are provided based on the reported channel state information, which comprises the modified channel state information or the original channel state information.

According to yet another embodiment of the present disclosure, a subscriber station is provided that includes an offset vector and a channel state information (CSI) generator. The offset vector comprises a plurality of offset values. The CSI generator is operable to apply the offset vector to original channel state information for each of a plurality of channels to generate modified channel state information for each of the channels. The CSI generator is also operable to identify a subset of the channels based on the modified channel state information and to report the original channel state information or the modified channel state information for the identified subset of the channels.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the term "each" means every one of at least a subset of the identified items; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless network.

Figure 1:
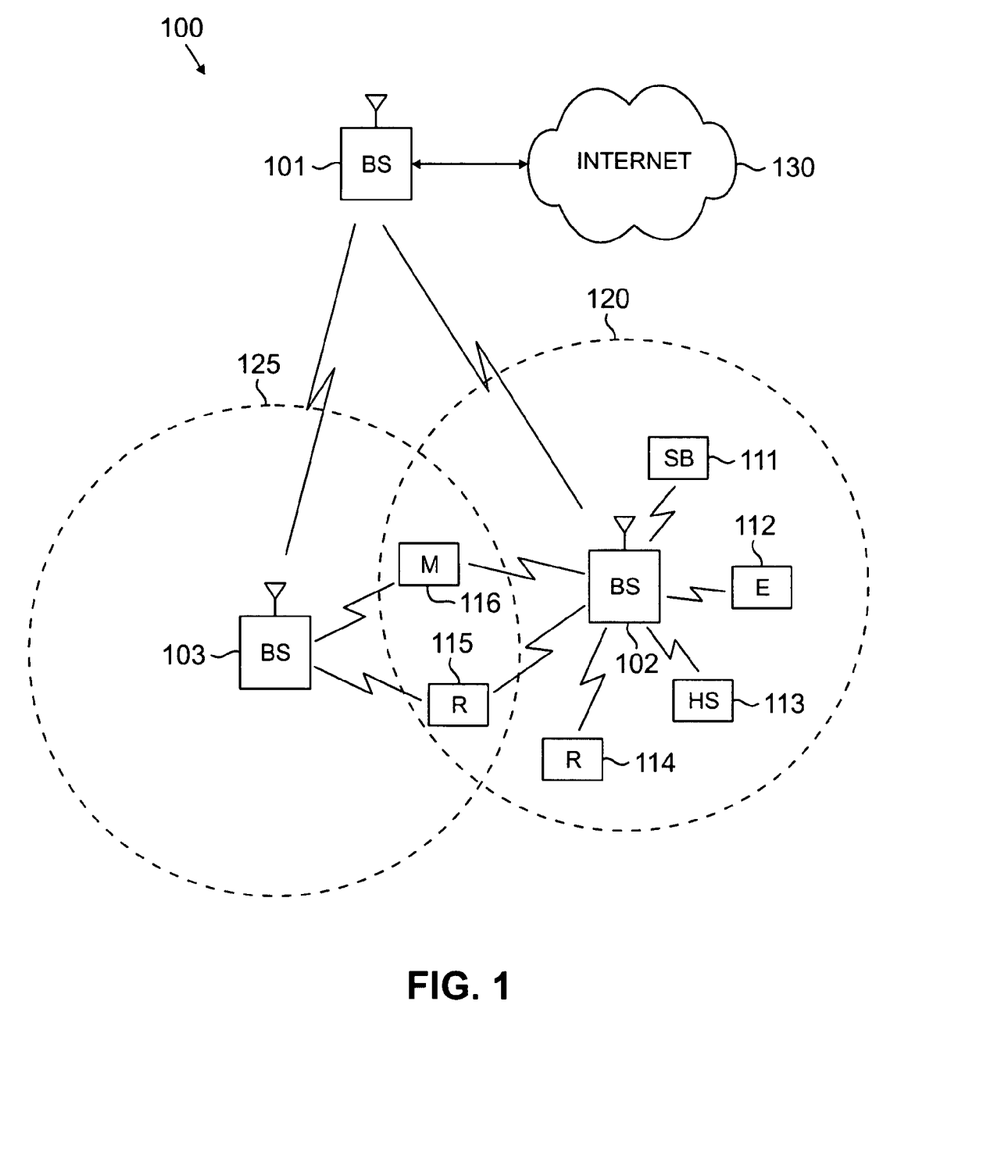
FIG. 1 illustrates an orthogonal frequency division multiplexing (OFDM) wireless network that is capable of providing channel state information feedback according to an embodiment of the present disclosure.

FIG. 1 illustrates an exemplary Orthogonal Frequency Division Multiplexing (OFDM) wireless network 100 that is capable of providing channel state information feedback according to one embodiment of the present disclosure. In the illustrated embodiment, wireless network 100 includes base station (BS) 101, base station (BS) 102, and base station (BS) 103. Base station 101 communicates with base station 102 and base station 103. Base station 101 also communicates with Internet protocol (IP) network 130, such as the Internet, a proprietary IP network, or other data network.

Base station 102 provides wireless broadband access to network 130, via base station 101, to a first plurality of subscriber stations within coverage area 120 of base station 102. The first plurality of subscriber stations includes subscriber station (SS) 111, subscriber station (SS) 112, subscriber station (SS) 113, subscriber station (SS) 114, subscriber station (SS) 115 and subscriber station (SS) 116. In an exemplary embodiment, SS 111 may be located in a small business (SB), SS 112 may be located in an enterprise (E), SS 113 may be located in a WiFi hotspot (HS), SS 114 may be located in a first residence, SS 115 may be located in a second residence, and SS 116 may be a mobile (M) device.

Base station 103 provides wireless broadband access to network 130, via base station 101, to a second plurality of subscriber stations within coverage area 125 of base station 103. The second plurality of subscriber stations includes subscriber station 115 and subscriber station 116.

In other embodiments, base station 101 may be in communication with either fewer or more base stations. Furthermore, while only six subscriber stations are shown in FIG. 1, it is understood that wireless network 100 may provide wireless broadband access to more than six subscriber stations. It is noted that subscriber station 115 and subscriber station 116 are on the edge of both coverage area 120 and coverage area 125. Subscriber station 115 and subscriber station 116 each may communicate with both base station 102 and base station 103 and may be said to be operating in soft handoff, as known to those of skill in the art.

In an exemplary embodiment, base stations 101-103 may communicate with each other and with subscriber stations 111-116 using a 3GPP LTE (Release 8), 3GPP2 UMB, or IEEE-802.16 wireless metropolitan area network standard, such as, for example, an IEEE-802.16e standard. In another embodiment, however, a different wireless protocol may be employed, such as, for example, a IEEE 802.20 wireless metropolitan area network standard. Base station 101 may communicate through direct line-of-sight with base station 102 and base station 103. Base station 102 and base station 103 may each communicate through non-line-of-sight with subscriber stations 111-116 using OFDM and/or OFDMA techniques.

Base station 102 may provide a T1 level service to subscriber station 112 associated with the enterprise and a fractional T1 level service to subscriber station 111 associated with the small business. Base station 102 may provide wireless backhaul for subscriber station 113 associated with the WiFi hotspot, which may be located in an airport, café, hotel, or college campus. Base station 102 may provide digital subscriber line (DSL) level service to subscriber stations 114, 115 and 116.

Subscriber stations 111-116 may use the broadband access to network 130 to access voice, data, video, video teleconferencing, and/or other broadband services. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer, a laptop computer, a gateway, or another device.

Dotted lines show the approximate extents of coverage areas 120 and 125, which are shown as approximately circular for the purposes of illustration and explanation only. It should be clearly understood that the coverage areas associated with base stations, for example, coverage areas 120 and 125, may have other shapes, including irregular shapes, depending upon the configuration of the base stations and variations in the radio environment associated with natural and man-made obstructions.

Also, the coverage areas associated with base stations are not constant over time and may be dynamic (expanding or contracting or changing shape) based on changing transmission power levels of the base station and/or the subscriber stations, weather conditions, and other factors. In an embodiment, the radius of the coverage areas of the base stations, for example, coverage areas 120 and 125 of base stations 102 and 103, may extend in the range from about 2 kilometers to about fifty kilometers from the base stations.

As is well known in the art, a base station, such as base station 101, 102, or 103, may employ directional antennas to support a plurality of sectors within the coverage area. In FIG. 1, base stations 102 and 103 are depicted approximately in the center of coverage areas 120 and 125, respectively. In other embodiments, the use of directional antennas may locate the base station near the edge of the coverage area, for example, at the point of a cone-shaped or pear-shaped coverage area.

The connection to network 130 from base station 101 may comprise a broadband connection, for example, a fiber optic line, to servers located in a central office or another operating company point-of-presence. The servers may provide communication to an Internet gateway for internet protocol-based communications and to a public switched telephone network gateway for voice-based communications. The servers, Internet gateway, and public switched telephone network gateway are not shown in FIG. 1. In another embodiment, the connection to network 130 may be provided by different network nodes and equipment.

In accordance with an embodiment of the present disclosure, each subscriber station 111-116 is operable to report a subset of available channel state information, such as Channel Quality Indicators (CQIs) or the like, to a base station 101-103 for use in scheduling and resource allocation. Each base station 101-103 may be operable to apply offsets to the channel state information received from subscriber stations 111-116 before using the information for scheduling and resource allocation. Each base station 101-103 is also operable to generate and/or adjust offsets to be applied to channel state information by subscriber stations 111-116.

Each subscriber station 111-116 is operable to apply offsets to the channel state information in order to determine which subset of the channel state information to report to a corresponding base station 101-103. Each subscriber station 111-116 may also be operable to generate the offsets to be applied by the subscriber station 111-116. The offsets may be used to balance system load such that no channel is overloaded or underutilized, to optimize performance for one or more subscriber stations 111-116 and/or for other suitable purposes.

Figure 2:
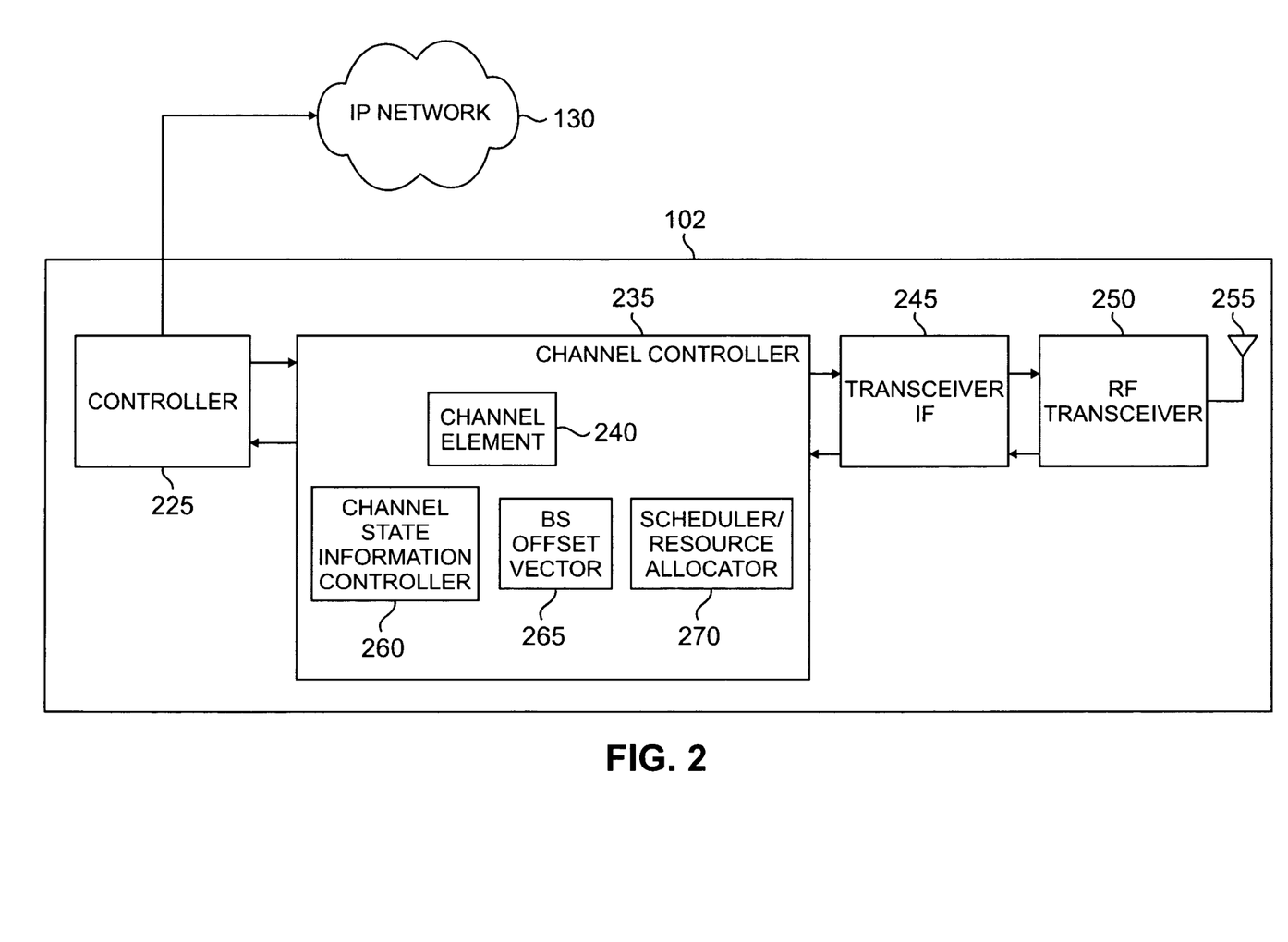
FIG. 2 illustrates an exemplary base station that is capable of processing channel state information according to an embodiment of the present disclosure.

FIG. 2 illustrates exemplary base station 102 in greater detail according to one embodiment of the present disclosure. Base station 102 is illustrated by way of example only. However, it will be understood that the components illustrated and described with respect to base station 102 are also part of base stations 101 and 103. In one embodiment, base station 102 comprises controller 225, channel controller 235, transceiver interface (IF) 245, radio frequency (RF) transceiver unit 250, and antenna array 255.

Controller 225 comprises processing circuitry and memory capable of executing an operating program that controls the overall operation of base station 102. In an embodiment, controller 225 may be operable to communicate with network 130. Under normal conditions, controller 225 directs the operation of channel controller 235, which comprises a number of channel elements, such as exemplary channel element 240, each of which performs bidirectional communication in the forward channel and the reverse channel. A forward channel (or downlink) refers to outbound signals from base station 102 to subscriber stations 111-116. A reverse channel (or uplink) refers to inbound signals from subscriber stations 111-116 to base station 102. Channel element 240 also preferably performs all baseband processing, including processing any digitized received signal to extract the information or data bits conveyed in the received signal, typically including demodulation, decoding, and error correction operations, as known to those of skill in the art. Transceiver IF 245 transfers bidirectional channel signals between channel controller 235 and RF transceiver unit 250.

Antenna array 255 transmits forward channel signals received from RF transceiver unit 250 to subscriber stations 111-116 in the coverage area of base station 102. Antenna array 255 is also operable to send to RF transceiver unit 250 reverse channel signals received from subscriber stations 111-116 in the coverage area of the base station 102. According to one embodiment of the present disclosure, antenna array 255 comprises a multi-sector antenna, such as a three-sector antenna in which each antenna sector is responsible for transmitting and receiving in a coverage area corresponding to an arc of approximately 120 degrees. Additionally, RF transceiver unit 250 may comprise an antenna selection unit to select among different antennas in antenna array 255 during both transmit and receive operations.

In accordance with an embodiment of the present disclosure, channel controller 235 also comprises a channel state information (CSI) controller 260, a BS offset vector 265, and a scheduler/resource allocator (S/RA) 270. Although illustrated and described as three separate components, it will be understood that any two or all of the CSI controller 260, the BS offset vector 265, and the S/RA 270 may be implemented together in a single component without departing from the scope of the present disclosure.

The CSI controller 260 is operable to generate and adjust the BS offset vector 265, which comprises a plurality of offsets that may be applied to channel state information, such as CQIs, received from subscriber stations 111-116. The CSI controller 260 is operable to determine whether or not to apply the BS offset vector 265 to the channel state information and, when determining that the BS offset vector 265 should be applied, to apply the BS offset vector 265 to the channel state information.

The CSI controller 260 is also operable to provide the channel state information, with or without the BS offset vector 265 applied, to the S/RA 270. The S/RA 270 is operable to provide scheduling and perform resource allocation for base station 102 based on the channel state information as provided by the CSI controller 260.

For some embodiments, the CSI controller 260 may also be operable to generate an SS offset vector for use by subscriber stations 111-116, as described in more detail below in connection with FIG. 3. The CSI controller 260 is also operable to adjust the SS offset vector based on channel conditions or other suitable criteria.

Figure 3:
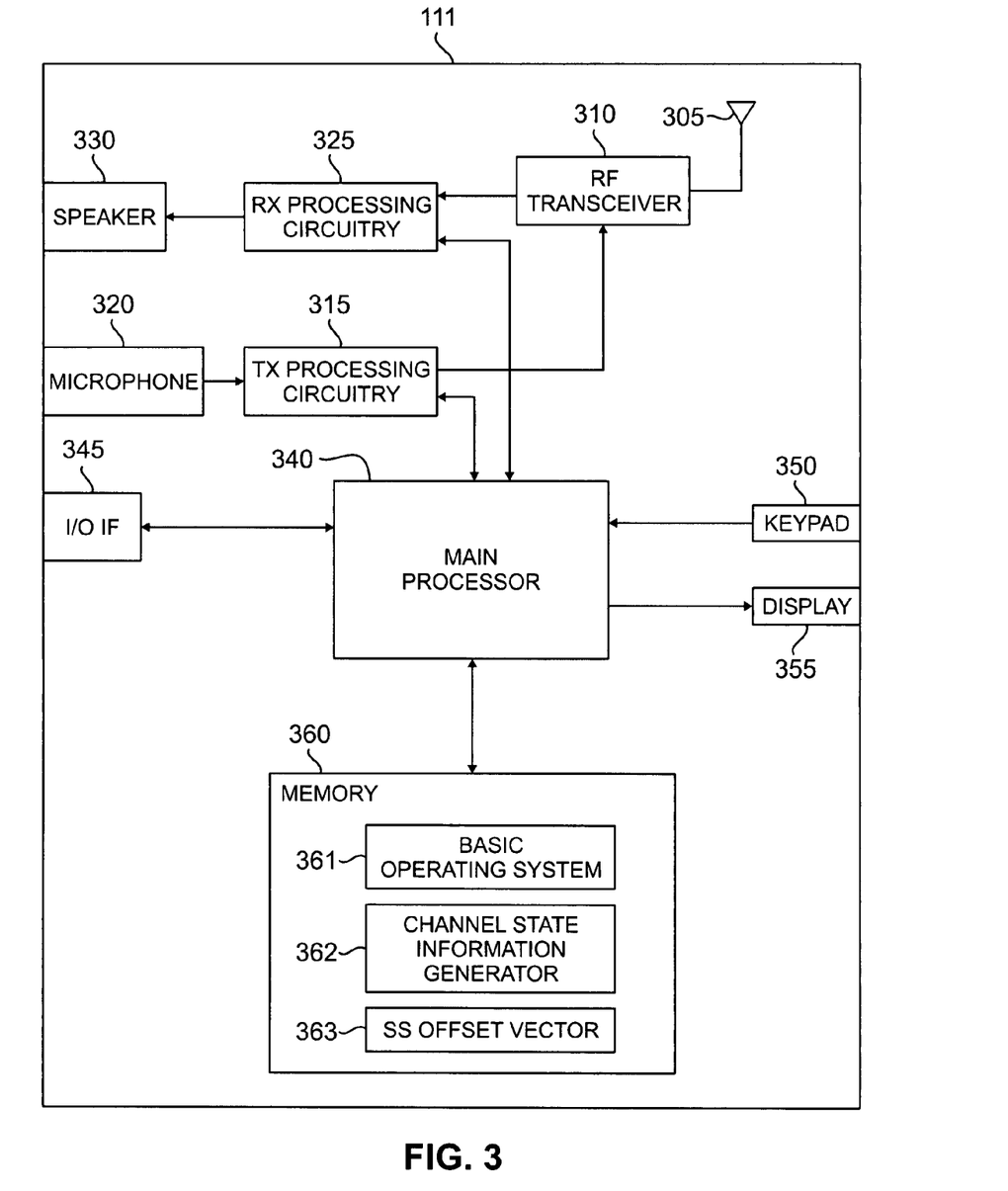
FIG. 3 illustrates an exemplary subscriber station that is capable of providing channel state information feedback to the base station of FIG. 2 according to an embodiment of the present disclosure.

FIG. 3 illustrates wireless subscriber station 111 according to an advantageous embodiment of the present disclosure. Wireless subscriber station 111 comprises antenna array 305, radio frequency (RF) transceiver 310, transmit (TX) processing circuitry 315, microphone 320, and receive (RX) processing circuitry 325. MS 111 also comprises speaker 330, main processor 340, input/output (I/O) interface (IF) 345, keypad 350, display 355, and memory 360. Memory 360 further comprises basic operating system (OS) program 361, channel state information (CSI) generator 362 and SS offset vector 363.

Radio frequency (RF) transceiver 310 receives from antenna array 305 an incoming RF signal transmitted by a base station of wireless network 100. Radio frequency (RF) transceiver 310 down-converts the incoming RF signal to produce an intermediate frequency (IF) or a baseband signal. The IF or baseband signal is sent to receiver (RX) processing circuitry 325 that produces a processed baseband signal by filtering, decoding, and/or digitizing the baseband or IF signal. Receiver (RX) processing circuitry 325 transmits the processed baseband signal to speaker 330 (i.e., voice data) or to main processor 340 for further processing (e.g., web browsing).

Transmitter (TX) processing circuitry 315 receives analog or digital voice data from microphone 320 or other outgoing baseband data (e.g., web data, e-mail, interactive video game data) from main processor 340. Transmitter (TX) processing circuitry 315 encodes, multiplexes, and/or digitizes the outgoing baseband data to produce a processed baseband or IF signal. Radio frequency (RF) transceiver 310 receives the outgoing processed baseband or IF signal from transmitter (TX) processing circuitry 315. Radio frequency (RF) transceiver 310 up-converts the baseband or IF signal to a radio frequency (RF) signal that is transmitted via antenna array 305.

In an advantageous embodiment of the present disclosure, main processor 340 is a microprocessor or microcontroller.

Memory 360 is coupled to main processor 340. According to an advantageous embodiment of the present disclosure, part of memory 360 comprises a random access memory (RAM) and another part of memory 360 comprises a non-volatile memory, such as Flash memory, which acts as a read-only memory (ROM).

Main processor 340 executes basic operating system (OS) program 361 stored in memory 360 in order to control the overall operation of wireless subscriber station 111. In one such operation, main processor 340 controls the reception of forward channel signals and the transmission of reverse channel signals by radio frequency (RF) transceiver 310, receiver (RX) processing circuitry 325, and transmitter (TX) processing circuitry 315, in accordance with well-known principles.

Main processor 340 is also operable to execute the CSI generator 362 in order to manage channel state information for subscriber station 111. The CSI generator 362 may be operable to generate the SS offset vector 363 and is operable to adjust the SS offset vector 363 based on a signal from base station 102. The SS offset vector 363 comprises a plurality of offsets that may be applied to the channel state information.

For one embodiment, CSI generator 362 is operable to measure channel state information, such as a CQI, for each of N channels over which subscriber station 111 may communicate with base station 102. The CSI generator 362 is also operable to apply the SS offset vector 363 to the channel state information to generate modified channel state information and to identify the channels for which channel state information is to be reported based on the modified channel state information. As used herein, "modified channel state information" means channel state information that has been modified by the application of the SS offset vector 363. The CSI generator 362 is also operable to determine whether to report the original channel state information or the modified channel state information for the identified channels and to report the chosen form of the channel state information to base station 102.

For the embodiment in which the channel state information comprises a CQI value for each channel, the channel state information may be represented as follows:

$$[CQI_1 \; CQI_2 \ldots CQI_N],$$

where $CQI_1$ is the CQI for channel i. For this embodiment, the SS offset vector 363 may be represented as follows:

$$[G_{s1} \; G_{s2} \ldots G_{sN}],$$

where $G_{si}$ is an offset that may be applied to $CQI_i$. Thus, when the CSI generator 362 applies the SS offset vector 363 to the channel state information, the resulting modified channel state information may be represented as follows:

$$[CQI_1+G_{s1} \; CQI_2+G_{s2} \ldots CQI_N+G_{sN}].$$

Similarly, the BS offset vector 265 may be represented as follows:

$$[G_{b1} \; G_{b2} \ldots G_{bN}],$$

where $G_{bi}$ is an offset that may be applied either to $CQI_i$ or to $CQI_i+G_{si}$, depending on which value is reported to base station 102.

For one embodiment, the BS offset vector 265 may be the same for all base stations 101-103 and/or the SS offset vector 363 may be the same for all subscriber stations 111-116. For another embodiment, the BS offset vector 265 for each base station 101-103 may be independent of the BS offset vectors 265 for other base stations 101-103. Similarly, the SS offset vector 363 for each subscriber station 111-116 may be independent of the SS offset vectors 363 for other subscriber stations 111-116. For yet another embodiment, the value of an offset for one or more particular channels may be the same for each BS offset vector 265 and/or for each SS offset vector 363. It will be understood that any other suitable embodiment may be implemented regarding relationships between the offsets of the offset vectors 265 and 363.

Figure 4:
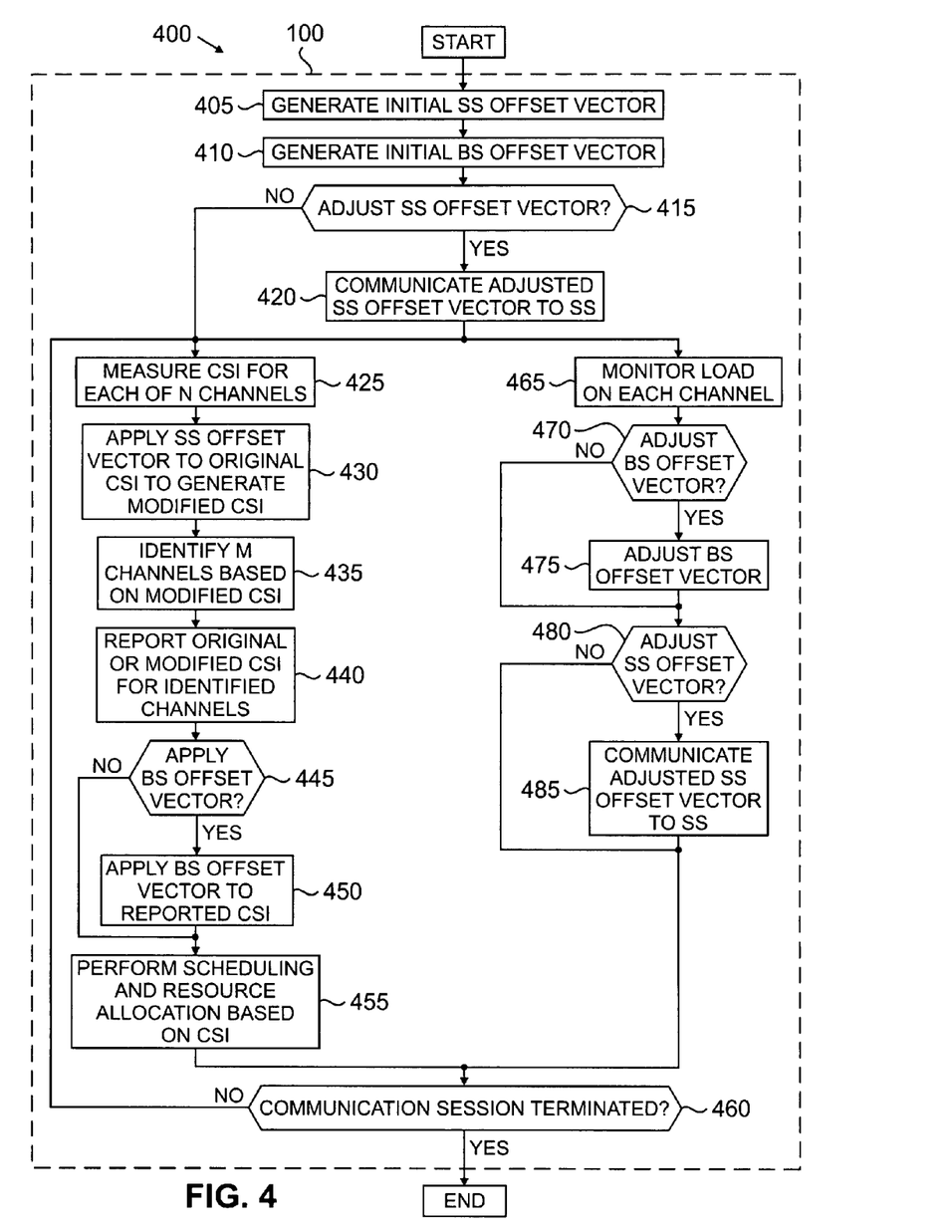
FIG. 4 is a flow diagram illustrating a method for providing channel state information feedback from the subscriber station of FIG. 3 to the base station of FIG. 2 according to an embodiment of the present disclosure.

FIG. 4 is a flow diagram illustrating a method 400 for providing channel state information feedback from a subscriber station, such as subscriber station 111, to a base station, such as base station 102, according to an embodiment of the present disclosure. Although the method is described with respect to a single subscriber station 111, it will be understood that base station 102 may perform the same method with respect to each subscriber station 111-116 in its coverage area 120.

Initially, an initial SS offset vector 363 is generated (process step 405). The initial SS offset vector 363 may be generated by the CSI generator 362, the CSI controller 260 or both 362 and 260. For a particular embodiment, the CSI generator 362 determines an average CQI value for multiple channels and derives the initial SS offset vector 363 based on the average CQI value. For another embodiment, the CSI generator 362 measures an average CQI value for multiple channels and provides the average CQI value to base station 102, where the CQI controller 260 derives the initial SS offset vector 363 based on the average CQI value. For this and other similar embodiments, it will be understood that base station 102 communicates the initial SS offset vector 363 to subscriber station 111. It will also be understood that the SS offset vector 363 may be otherwise suitably generated without departing from the scope of this disclosure.

An initial BS offset vector 265 is also generated (process step 410). The initial BS offset vector 265 may be generated by the CSI controller 260. For a particular embodiment, the initial BS offset vector 265 may be generated based on an average CQI value provided by subscriber station 111. It will be understood that the BS offset vector 265 may be otherwise suitably generated without departing from the scope of this disclosure.

The CSI controller 260 may determine whether or not to adjust the initial SS offset vector 363 based on channel conditions or other suitable criteria when the CSI generator 362 has generated the initial SS offset vector 363 (process step 415). If the CSI controller 260 determines that the initial SS offset vector 363 should be adjusted (process step 415), the CSI controller 260 communicates the adjusted SS offset vector 363 to subscriber station 111 (process step 420). The adjusted SS offset vector 363 may be communicated using signaling messages, the control channel or other suitable mechanism.

At this point, two processes may be performed in parallel, as illustrated in FIG. 4. Thus, steps 425, 430, 435, 440, 445, 450 and 455 may be performed along with steps 465, 470, 475, 480 and 485. Each process may continue to be performed until the communication session is terminated (process step 460).

The CSI generator 362 measures channel state information (CSI) for each of N channels (process step 425). For one embodiment, the N channels comprise each of the channels over which subscriber station 111 is operable to communicate with base station 102. For a particular embodiment, the CSI generator 362 measures a CQI for each channel.

The CSI generator 362 applies the SS offset vector 363 to the original channel state information to generate modified channel state information (process step 430). The CSI generator 362 identifies M channels to be reported to base station 102 based on the modified channel state information (process step 435). The value of M may be any suitable number less than or equal to N. For the embodiment in which the channel state information comprises a CQI for each channel, the modified channel state information comprises a modified CQI for each channel and the CSI generator 362 identifies the M channels which correspond to the M highest modified CQI values. The CSI generator 362 may report either the original channel state information or the modified channel state information for the M identified channels to base station 102 (process step 440).

The CSI controller 260 determines whether or not to apply the BS offset vector 265 to the channel state information, either original or modified as reported by subscriber station 111 (process step 445). If the CSI controller 260 determines that the BS offset vector 265 should be applied (process step 445), the CSI controller 260 applies the BS offset vector 265 to the reported channel state information to generate modified, reported channel state information (process step 450). The S/RA 270 then performs scheduling and resource allocation based on the reported channel state information (if process step 450 is not performed) or based on the modified, reported channel state information (if process step 450 is performed).

As described above, if the communication session has not been terminated (process step 460), the CSI generator 362 continues to measure channel state information for each of the N channels (process step 425), and the method continues as before. However, if the communication session has been terminated (process step 460), the method comes to an end.

For the parallel process, the CSI controller 260 monitors the load on each channel used for communicating with subscriber stations 111-116 (process step 465). The CSI controller 260 may then determine whether or not to adjust the BS offset vector 265 based on the current load on each channel (process step 470). For example, for one embodiment, the CSI controller 260 may decide to adjust the BS offset vector 265 to reflect actual achievable CQI for subscriber station 111 in a particular channel, to balance the system load, to optimize the performance of subscriber station 111, a particular set of subscriber stations 111-116 or the entire system, to take into account changing channel conditions due to frequency hopping, frequency reuse or the like, or for any other suitable purpose. If the CSI controller 260 determines that the BS offset vector 265 should be adjusted (process step 470), the CSI controller 260 adjusts the BS offset vector 265 to redistribute the load (process step 475).

The CSI controller 260 may also determine whether or not to adjust the SS offset vector 363 based on the current load on each channel (process step 480). For example, for one embodiment, the CSI controller 260 may decide to adjust the SS offset vector 363 to avoid some channels becoming heavily loaded and/or other channels being underutilized, to take into account changing channel conditions due to frequency hopping, frequency reuse or the like, or for any other suitable purpose. If the CSI controller 260 determines that the SS offset vector 363 should be adjusted (process step 480), the CSI controller 260 communicates the adjusted SS offset vector 363 to subscriber station 111 in order to redistribute the load (process step 485).

Again, as described above, if the communication session has not been terminated (process step 460), the CSI controller 260 continues to monitor the load on each channel used for communicating with subscriber stations 111-116 (process step 465), and the method continues as before. However, if the communication session has been terminated (process step 460), the method comes to an end.

In this way, the amount of channel state information feedback overhead from subscriber stations 111-116 is reduced by having each subscriber station 111-116 report channel state information for only a subset of the channels. Performance may then be improved by selectively transmitting to subscriber stations 111-116 on channels with favorable channel conditions. However, because of the application of the SS offset vector 363 and possibly the BS offset vector 265, no single channel will become overloaded or be inefficiently utilized.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of providing channel state information feedback in a wireless communication system, the method comprising:
measuring an original channel state information comprising an original Channel Quality Indicator (CQI) for each of a plurality of channels;
applying an offset vector to the original channel state information to generate modified channel state information, the offset vector comprising a plurality of offset values, each offset value corresponding to one of the original CQIs, the modified channel state information comprising information associated with the original CQI for each of the plurality of channels;
identifying, by a subscriber station, a subset of the channels based on the modified channel state information;
reporting one of the original channel state information and the modified channel state information for the identified subset of the channels; and
adjusting the plurality of offset values of the offset vector based on a load on each of the plurality of channels so as to redistribute the load on each channel in order to balance an overall system load such that no channel is overloaded or underutilized, wherein the load on each of the plurality of channels is monitored by a base station serving the subscriber station.

2. The method as set forth in claim 1, wherein applying the offset vector comprises adding each of the plurality of offset values to the corresponding original CQI to generate a modified CQI.

3. The method as set forth in claim 2, wherein identifying the subset of the channels comprises identifying a specified number of channels corresponding to the highest modified CQIs.

4. The method as set forth in claim 1, wherein the plurality of offset values of the offset vector are adjusted based on a signal received from the base station.

5. The method as set forth in claim 1, further comprising generating the offset vector.

6. The method as set forth in claim 5, further comprising determining an average CQI based on the original CQI for each channel, wherein generating the offset vector comprises generating the offset vector based on the average CQI.

7. The method as set forth in claim 1, further comprising applying another offset vector to the original channel state information to compensate for changing channel conditions due to a frequency hopping schedule or frequency reuse scheme of the subset of channels.

8. The method as set forth in claim 7, wherein the plurality of offset values of the offset vector are adjusted based on a signal received from the base station.

9. A method of providing channel state information feedback in a wireless communication system in which a plurality of channels are available for communication, the method comprising:
- receiving reported channel state information for each of a subset of channels from a subscriber station, the subset of channels identified by the subscriber station based on modified channel state information comprising an original Channel Quality Indicator (CQI), the modified channel state information generated based on original channel state information;
- applying an offset vector to the reported channel state information to generate modified, reported channel state information, the offset vector comprising a plurality of offset values, each offset value corresponding to one of the original CQIs;
- providing scheduling and resource allocation based on the reported channel state information, the reported channel state information comprising one of the modified, reported channel state information and the original channel state information;
- monitoring the load on each of the plurality of channels; and
- adjusting the plurality of offset values of the offset vector based on the load on each of the plurality of channels so as to redistribute the load on each channel in order to balance an overall system load such that no channel is overloaded or underutilized.

10. The method as set forth in claim 9, wherein providing scheduling and resource allocation based on the reported channel state information comprises providing scheduling and resource allocation based on the modified, reported channel state information.

11. The method as set forth in claim 9, further comprising communicating an adjusted SS offset vector to a subscriber station associated with the SS offset vector when the determination is made to adjust the SS offset vector.

12. The method as set forth in claim 11, communicating the adjusted SS offset vector comprising communicating the adjusted SS offset vector using one or more signaling messages and a control channel.

13. A subscriber station configured to provide channel state information feedback to a base station in a wireless communication system, the subscriber station comprising:
- a memory configured to store an offset vector comprising a plurality of offset values; and
- a processor configured to:
  - apply the offset vector to original channel state information for each of a plurality of channels to generate modified channel state information comprising an original Channel Quality Indicator (CQI) for each of the plurality of channels, the offset vector comprising a plurality of offset values, each offset value corresponding to one of the original CQIs;
  - identify a subset of the plurality of channels based on the modified channel state information;
  - report one of the original channel state information and the modified channel state information for the identified subset of the plurality of channels; and
  - adjust the plurality of offset values of the offset vector based on a load on each of the plurality of channels so as to redistribute the load on each channel in order to balance an overall system load such that no channel is overloaded or underutilized, wherein the load on each of the plurality of channels is monitored by a base station serving the subscriber station.

14. The subscriber station as set forth in claim 13, wherein the CSI generator is configured to apply the offset vector by adding each offset value to a corresponding original CQI to generate a modified CQI.

15. The subscriber station as set forth in claim 14, wherein the CSI generator is configured to identify the subset of the plurality of channels by identifying a specified number of channels corresponding to the highest modified CQIs.

16. The subscriber station as set forth in claim 13, wherein the CSI generator is further configured to adjust the offset vector based on a signal received from the base station.

17. The subscriber station as set forth in claim 13, wherein the CSI generator is further configured to generate the offset vector.

18. The subscriber station as set forth in claim 17, wherein the CSI generator is further configured to determine an average CQI based on the original CQI for each of the plurality of channels and to generate the offset vector based on the average CQI.

19. The subscriber station as set forth in claim 13, wherein the CSI generator is further configured to apply another offset vector to the original channel state information to compensate for changing channel conditions due to a frequency hopping schedule or frequency reuse scheme of the subset of channels.

20. The subscriber station as set forth in claim 19, wherein the CSI generator is further configured to adjust the offset vector based on a signal received from the base station.

* * * * *